(12) United States Patent
Rack et al.

(10) Patent No.: US 12,276,569 B2
(45) Date of Patent: Apr. 15, 2025

(54) METHOD FOR RECOGNIZING AN ERROR IN A SENSOR SIGNAL DURING OPERATION OF A FUEL INJECTOR

(71) Applicant: Robert Bosch GmbH, Stuttgart (DE)

(72) Inventors: Lars-Oliver Rack, Marbach (DE); Ralph Kober, Markgroeningen (DE); Andreas Schmitt, Horneburg (DE); Egbert Fuchs, Stuttgart-Feuerbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 292 days.

(21) Appl. No.: 17/956,513

(22) Filed: Sep. 29, 2022

(65) Prior Publication Data

US 2023/0107124 A1   Apr. 6, 2023

(30) Foreign Application Priority Data

Oct. 6, 2021   (DE) .................. 10 2021 211 261.7

(51) Int. Cl.
*G01M 15/04*   (2006.01)

(52) U.S. Cl.
CPC ................................ *G01M 15/042* (2013.01)

(58) Field of Classification Search
CPC .................................................. G01M 15/042
See application file for complete search history.

(56) References Cited

U.S. PATENT DOCUMENTS

| 8,166,806 B2* | 5/2012 | Kappelmann | F02D 41/221 73/114.49 |
| 2013/0167809 A1* | 7/2013 | Siedentopf | F02M 65/003 123/478 |
| 2015/0153242 A1* | 6/2015 | Jenne | G01L 27/007 73/1.69 |
| 2017/0074203 A1* | 3/2017 | Kober | F02M 57/005 |

FOREIGN PATENT DOCUMENTS

| DE | 102012222851 A1 | 6/2014 |
| DE | 102014204098 A1 | 9/2015 |
| DE | 102015201514 A1 | 8/2016 |
| DE | 102015212119 A1 | 1/2017 |
| DE | 102015226620 A1 | 6/2017 |
| DE | 102019210713 A1 | 1/2021 |

\* cited by examiner

*Primary Examiner* — Eric S. McCall
(74) *Attorney, Agent, or Firm* — NORTON ROSE FULBRIGHT US LLP; Gerard A. Messina

(57) ABSTRACT

A method for recognizing an error in a sensor signal during operation of a fuel injector of an internal combustion engine. In the method, a switch valve of the fuel injector is activated with the aid of an activation signal, and the sensor signal is detected as a signal of a sensor, which is provided for the purpose of detecting characteristic operating points of the fuel injector, in a respectively predefined time window of the sensor signal, which includes a point in time of a characteristic operating point of the fuel injector. At least one property of the sensor signal is determined, which includes a signal level and/or a rise time. It is determined, based on the at least one property of the sensor signal, whether an error is present.

12 Claims, 12 Drawing Sheets

METHOD FOR RECOGNIZING AN ERROR IN A SENSOR SIGNAL DURING OPERATION OF A FUEL INJECTOR

FIELD

The present invention relates to a method for recognizing an error in a sensor signal during operation of a fuel injector of an internal combustion engine, in which the sensor signal is detected as a signal of a sensor, which is provided for the purpose of detecting characteristic operating points of the fuel injector, and to a processing unit and to a computer program for carrying out the method.

BACKGROUND INFORMATION

Modern internal combustion engines have fuel injectors, with which fuel is able to be introduced into combustion chambers in a targeted manner. For an accurate control of the internal combustion engine, characteristic operating points such as points in time of the injection processes, in particular, an opening and closing of the injection valves of the fuel injectors, must be preferably accurately detected.

In the case of fuel injectors, in which the opening and closing takes place directly via solenoid valves, piezo actuators or the like, the electrical activation variables may often be used for detecting such characteristic points in time.

In the case of fuel injectors, in which a switch valve or servo valve is initially activated, however, there is no direct connection between the electrical activation variables of the fuel injector and the opening or closing points in time of the injection valve. Additional sensors may therefore be used in such fuel injectors, whose signals are influenced, for example, by the fuel pressure in a control space or in a high pressure line of the fuel injector.

SUMMARY

According to the present invention, a method for recognizing an error in a sensor signal during operation of a fuel injector, as well as a processing unit and a computer program for carrying out the method, are provided. Advantageous embodiments of the present invention are disclosed herein.

The present invention is directed to the use of a sensor, which is provided for the purpose of detecting or determining characteristic operating points of the fuel injector such as, for example, points in time of the opening of the switch valve, or of the closing of the nozzle needle of the fuel injector or also a point in time of the reversal of the nozzle needle. Such a sensor is also referred to as a Needle Closing Sensor (NCS).

In the case of a pressure-compensated switch valve (solenoid valve) of the fuel injector, the central armature bolt reacts, for example, sensitively, to the change in characteristic features such as nozzle needle closing. The integration, for example, of a piezo sensor directly via this armature bolt allows for a robust feature recognition with relatively minimal design complexity. The sensor signal is then generally proportional to the pressure gradient of the valve chamber located below the central armature bolt. It is also possible, however, that deformations of a holding body close to a high pressure bore of the fuel injector are detected with the aid of such a sensor.

The signal of such a sensor—the sensor signal—may be detected and evaluated in the process with respect to characteristic features, in order to be able to deduce the specific points in time of the aforementioned operating points of the fuel injector.

Various errors may now result, however, which result in a distortion of the sensor signal, which may result in an erroneous recognition of the aforementioned points in time. Since these points in time are used, in particular, also for determining fuel quantities to be injected or for regulating the fuel quantity amount, this may result in imprecise injection quantities and, potentially, among other things, in increased emissions. In this respect, such errors should be preferably recognized in order to be able to eliminate them or, if necessary, to be able to replace the fuel injector. This may take place, for example, within the scope of a so-called on-board diagnosis (OBD). For this purpose, the sensor signal may be evaluated in a suitable manner.

Typical errors are, for example, short-circuit of the sensor signal or of the sensor to ground, short-circuit to battery (positive pole) and an electrical interruption of a sensor signal (for example, cable break or sensor failure). To recognize these errors, it may be checked, for example, whether the signal amplitude (amplitude of the sensor signal) in a predefined time window (measuring window) of the sensor signal, which includes the reversal of the nozzle needle (needle reverse point) as the point in time of a characteristic operating point of the fuel injector, is too low, in particular, implausibly too low. If so, the mean value of the sensor signal may, for example, be calculated in the measuring window. Based on the mean value, the error may then be assigned to one of the three types of error or error types.

If the sensor signal is interrupted (cable break or sensor failure), a quiescent level of the sensor signal, which is approximately 3 V, is detected or measured in a read-out unit (for example, a control unit, a measuring circuit). In a short-circuit to ground, the level of the sensor signal is significantly lower than this quiescent level (approximately 3 V); in a short-circuit to the battery, the level of the sensor signal is significantly higher than this quiescent level (approximately 3 V).

To classify the errors, two recognition thresholds (threshold values), for example, may be used. If the mean value is lower than a lower recognition threshold of, for example, 1.3 V, then a short-circuit to ground is recognized and, if necessary, reported. If the mean value is higher than an upper recognition threshold of, for example, 7 V, then a short-circuit to battery is recognized and, if necessary, reported. The upper recognition threshold should preferably be defined as a function of the battery voltage. With increasing battery voltage, the upper recognition threshold should become higher.

It has been found, however, that there are further errors, which are unable to be recognized in this manner. These are, in particular, a shunt (short-circuit with non-negligible resistance) to ground or to battery voltage and an increased contact resistance between the sensor and the read-out unit.

The aspect of the shunt will initially be considered. A short-circuit to ground or to battery voltage may be recognized using the aforementioned diagnostic concept only when the (electrical) resistance of the short-circuit is so low that the amplitude of the sensor signal changes significantly. A typical recognition threshold is, for example, that the signal amplitude must be lower than approximately 5% to 10% of the nominal value. This results in the limitation that the resistance (of the short-circuit) in a typical application must be lower than approximately 400 ohms, but must at least (in general) fall below a certain value. A higher resistance of, for example, approximately 400 ohms between the sensor signal and ground or battery voltage is, in general, not able to be recognized using a typical approach.

The terms short-circuit and shunt, in particular, will be used below for differentiating the errors. These are to be understood as follows. An electrical short-circuit is present at a resistance of less than 400 ohms, or when it is unable to be recognized using the above-described (conventional) approach. An electrical shunt is said to be present at a resistance of more than 400 ohms, or when it is unable to be recognized using the above-described approach. Nevertheless, a shunt is, however, in principle, also a short-circuit.

In practice, a shunt to ground is usually significantly more probable than a shunt to battery, because the entire body of the fuel injector generally corresponds permanently to the signal mass. In contrast, the battery voltage is present merely temporarily at the high-side connection of the coil (in the case of solenoid valve injectors) during the electrical activation with periodic interruptions. The effects on the sensor signal will therefore be demonstrated by way of example below for a shunt to ground, even though this also applies to a shunt to battery.

A shunt to ground causes the quiescent level of the sensor signal to be lower than usual prior to the first activation. In addition, the time constant, with which the electric charge of the sensor drains, is also smaller than usual.

A shunt to ground with a resistance of, for example, 1 Mohm or 100 kohms results essentially in a shift of the signal level downward. The shape of the sensor signal, however, does not significantly change. In contrast, a shunt to ground with a resistance of, for example, 10 kohms results in a clearly recognizable change of the signal shape. In such a case, typical algorithms (in the control unit) for determining the valve opening point in time, the needle reverse point in time, and the needle closing point in time may potentially deliver clearly erroneous measured values.

However, using the methods for error recognition (diagnosis) mentioned at the outset, no error is recognized or reported, because the signal amplitude may be even slightly higher than in the error-free state. Even in the case of a shunt to ground with a resistance of, for example, 1 kohm, the diagnosis is not yet responsive even though the sensor signal no longer has much in common with its original shape. Strong changes in the signal shape usually mean that valid measured values for the valve opening point in time, for the needle reverse point in time or the needle closing point in time are no longer found in the control unit, because the plausibility criteria contained in the algorithms for the signal evaluation are no longer met. The aforementioned examples including the various resistances and resulting signal changes are shown in the figures.

Thus, a Shunt of the Sensor Signal to Ground (or to Battery) May Result in Measured Values being Erroneous or Completely Lacking.

Typical diagnostic methods, however, do not recognize an electrical shunt.

A short-circuit to ground is generally always considered to be a possible and expected risk, for example, by pinching a cable. Until now, however, a shunt with a resistance of multiple kohms has been considered to be unlikely. However, it has been shown that, in particular, in two scenarios, such shunts may occur. On the one hand, this may be the case at the engine test bench or in a test vehicle when measuring devices are connected in order to record the sensor signal. The input impedance of the measuring devices represents a shunt to ground. This problem may, for example, be solved by the use of an isolation amplifier.

On the other hand, it has been found that during the assembly process, metal parts or metal shavings in the plastic coating of the connector for the sensor could be entrapped in the fuel injector. Very thin metal fibers entrapped in this way may cause an electrical shunt between the sensor signal and the body of the fuel injector (ground). The electrical resistance of the metal fibers entrapped in the injector may vary considerably, for example, depending on the geometry of the metal fiber and its contact to the body. The resistance value in this case may depend heavily on the injector temperature. Some shunts occur, for example, at room temperature, others, on the other hand, only at high temperatures at the engine. Because of the temperature dependency, it is difficult to reliably recognize such faulty fuel injectors during a factory test. Other causes, such as a contamination of the sensor during manufacturing, could also result in a shunt.

Against this background, as one aspect of the present invention, an approach is now provided, based, in particular, on the sensor signal being at least one property of the sensor signal, for recognizing an error, which includes a short circuit, in particular, the mentioned shunt, for example, to ground or also to (positive) battery voltage. According to an example embodiment of the present invention, for this purpose, a signal level of the sensor signal is determined as the at least one property of the sensor signal in a predefined time window (measuring window) of the sensor signal, in particular, in one which includes the point in time of an opening of the switch valve (valve opening point in time) as an operating point. Based on the signal level, it is then determined whether an error is present. A start of the predefined time window may, for example, be determined as a function of a start, optionally, also of an end, of the activation of the actuator. The length may also be suitably selected. A signal level in this case is understood to mean, in particular, a potentially mean value of the sensor signal or of its amplitude, which is present before the sensor signal changes due to the activation of the fuel injector or of its actuator. It is thus a type of quiescent level.

The signal level in the measuring window 'valve opening' is preferably determined during the temporally initial activation of an injection sequence, because there the curve of the sensor signal is generally largely constant. Hydraulic pressure oscillations, which have been triggered by preceding injections, have generally completely or largely faded there.

The signal level in this case may, in particular, be compared with one or with multiple level threshold values, it being determined as a function of the comparison whether an error is present. Level threshold values in this case include, in particular, the threshold values or recognition thresholds already used for the conventional error recognition.

In this context, it is noted that the error recognition via the signal level may be carried out in addition to the mentioned, conventional error recognition.

To increase the robustness of the error recognition, i.e., of the diagnostic method, it may also be checked whether a sufficiently long injection pause (for example, 2 ms) was present prior to the measuring window 'valve opening.' This may ensure that the signal level is sufficiently stable and reliable and not potentially distorted by hydraulic pressure oscillations of a closely preceding injection.

Both observations or error recognitions "signal amplitude in the measuring window 'needle reverse point'" and "signal level in the measuring window 'valve opening'" may, as mentioned, proceed in parallel or separately from one another. The pieces of error information of both methods may be collected in terms of a logical OR-link.

A case distinction as to whether it is an electrical short-circuit (for example, resistance lower than 400 ohms) or an electrical shunt (for example, resistance greater than 400 ohms) is also possible. To simplify the on-board diagnosis, however, it is provided to use a common error path for both types of errors, because the error search strategy in the repair shop is identical in both cases.

The error debouncing as compared to the previous diagnostic concept does not change. Merely the meaning of the error paths is expanded. Short-circuit or shunt to ground, and short-circuit or shunt to battery.

In addition, according to an example embodiment of the present invention, it may be provided to calculate the shunt resistance based on the signal level. For example, it may namely be advantageous for the repair shop diagnosis or for the fleet surveillance in the field if in addition to the error path, supplemental pieces of information relating to an electrical error are also known. For this purpose, particular physical variables determined from a digital value of the signal level typically present in the software may be calculated. This is, for example, the value of the electrical voltage of the signal level. The conversion may take place via a characteristic curve stored in the control unit. This voltage value then corresponds approximately to the value that would be measured with a multimeter at the control unit connector or at one of the injectors. The resistance value of an electrical shunt to ground or to battery may also be determined. For a shunt to ground, a characteristic curve stored in the control unit may be used for the conversion. For a shunt to battery, a characteristic diagram is necessary for the conversion, because the value is also a function of the battery voltage.

The aforementioned additional pieces of information may, for example, be stored as freeze frame data in the error memory. Equally, the values may also be displayed on a diagnostic tester during the error search in the repair shop.

The aspect of the increased contact resistance will be considered below. An increased contact resistance, i.e., a contact resistance between the sensor and a read-out unit, which is higher than a setpoint value (nor normal value or reference value), may be recognized using the above-described diagnostic concept only when the damping by the RC element from contact resistance and input capacitance significantly reduces the signal amplitude. This corresponds to a resistance value of the contact resistance of approximately 400 kohms during idle and 800 kohms at full-load (of the internal combustion engine).

However, an increased contact resistance between sensor (NCS) and control unit has ramifications. Such a contact resistance forms an RC low-pass with the input capacitance of the NCS measuring circuit (read-out unit) in the control unit. This additional filtering has, in particular, two ramifications. On the one hand, the sensor signal is damped by the low-pass filter and the amplitude of the sensor signal is reduced. On the other hand, the time constant with which the electrical load of the sensor flows into the measuring circuit becomes greater. The features in the sensor signal are thus shifted temporally to late.

As has been shown, the sensor signal is significantly smoother at a contact resistance of, for example, 50 kohms, than the signal in an error-free state. At this contact resistance, algorithms for determining the points in time: valve opening, needle reverse point and needle closing may deliver already clearly erroneous measured values. With increasing contact resistance, the cut-off frequency of the low-pass filtering drops, so that the shape of the sensor signal at, for example, 500 kohms no longer has much in common with the original shape. Such drastic changes in the signal shape usually mean that valid measured values for the valve opening point in time, the needle reverse point in time or the needle closing point in time are no longer found in the control unit, because the plausibility criteria contained in the algorithms for signal evaluation are not met. The aforementioned examples including the various resistances and resulting signal changes are shown in the figures.

Even at a contact resistance of 400 kohms, the above-described diagnostic method reports no errors, since the amplitude of the signal is still above the diagnostic threshold for the amplitude. Thus, an increased contact resistance at the sensor (NCS) may result in measured values being erroneous or lacking. Typical diagnostic methods, however, do not recognize an increased contact resistance.

Even if the likelihood of occurrence of an increased contact resistance at the NCS is low, one cause may, for example, be a vibrational stress of the injector, which results in abrasion of the silver coating at the connector pin. In addition, moisture could enter into the connector, thereby corroding the underlying copper.

Against this background, as one further aspect of the present invention, an approach is now provided, based, in particular, on the rise time as at least one property of the sensor signal, for recognizing an error, which includes a contact resistance between the sensor and a read-out unit, which is higher than a setpoint value.

According to an example embodiment of the present invention, for this purpose, a rise time of the sensor signal is determined as the at least one property of the sensor signal in a predetermined time window (measuring window) of the sensor signal, in particular, in one which includes the point in time of a reversal of the nozzle needle of the fuel injector (needle reverse point in time) as an operating point. Based on the rise time, it is then determined whether an error is present. A start of the predefined time window may, for example, be determined as a function of a start, optionally, also of an end, of the activation of the actuator. The length may also be suitably selected. A rise time in this case is understood to mean, in particular, a time duration, which is required until the amplitude or the potentially mean value of the sensor signal has risen from a lower level (at the start of the measuring window) to an upper level (at the end of the measuring window).

The rise time of the sensor signal in the measuring window 'needle reverse point' is ascertained preferably based on a gradient profile, i.e., a profile of a temporal derivation of the sensor signal. For this purpose, a threshold is calculated via a threshold value factor based on the maximum gradient in the measuring window 'needle reverse point,' and the point in time is subsequently ascertained when this threshold value prior to and after the point in time of the maximum gradient is passed through. The rise time may then be calculated as the difference between the two points in time of the threshold value passage. Alternatively, a rise time may be ascertained at the sensor signal (raw signal) using the amplitude.

The rise time of the sensor signal in the measuring window 'needle reverse point' is a function of, among other things, the activation duration, the rail pressure (pressure in the high pressure accumulator, via which the fuel injector is supplied with fuel), the injector temperature and the fuel, and is subject to high dynamics during the driving operation. Since dynamic changes of the operating point (of the internal combustion engine) occur in similar measure at all cylinders, an increased contact resistance at an injector may be detected by the comparison with the injectors at other cylinders. The injector at the affected cylinder has an increased rise time compared to the other cylinders.

Thus, the rise time is preferably compared with a reference rise time, and it is determined as a function of the comparison whether an error is present. If the rise time is higher than the reference rise time by more than a predetermined time threshold value, it is determined, for example, that an error is present. Thus, a reference rise time then also includes, in particular, a rise time of another fuel injector of the internal combustion engine or a mean rise time of multiple other fuel injectors of the internal combustion engine.

In each injection cycle, the cylinder having the second shortest rise time is preferably ascertained, and the difference thereto is formed for each cylinder. To further increase the robustness, the difference for each cylinder may be PT1-filtered. If the output of the PT1 filter exceeds a recognition threshold, an increased contact resistance is then recognized and, if necessary, reported.

In order to compare rise times at similar activation durations in each injection cycle, the difference from the second shortest rise time may be preferably calculated in an injection type-specific manner or only in one injection type, for example, in the main injection.

In this context, it is noted that the error recognition may be carried out via the signal level in addition to the mentioned, conventional error recognitions, in particular, however, only when these other error recognitions do not result in any recognized error. The recognition may also take place with respect to the increased contact resistance in addition to that of the shunt.

Since the monitoring of the rise time in the case of an electrical interruption at the sensor (NCS) or at a short-circuit of the NCS to battery voltage or to ground would not yield any meaningful results, the monitoring "signal amplitude in the measuring window 'needle reverse point'" for detecting an electrical interruption takes place preferably before the monitoring "rise time in the measuring window 'needle reverse point.'" A case distinction as to whether it is an electrical interruption or an increased contact resistance is also possible. To simplify the on-board diagnosis, however, it is provided to use a common error path for both types of errors, because the error search strategy in the repair shop is identical in both cases. The error debouncing as compared with the previous diagnostic concept does not change here either.

Each of the provided aspects may yield overall the following advantages: the reliability and the product safety of the entire system for fuel injection are improved. The risk of undesirable malfunctions and/or customer complaints in the field drops. The repair shop diagnosis is improved. The customer saves time and costs in the error search. Moreover, the statutory OBD requirements are better and more easily adhered to. The expense for the certification of new vehicle types is reduced.

A processing unit according to the present invention, for example, a control unit of a motor vehicle, is configured, in particular, programmed, to carry out a method according to the present invention.

The implementation of a method according to the present invention in the form of a computer program or computer program product including program code is advantageous for carrying out all method steps, since this results in particularly low costs, in particular, if an executing control unit is also utilized for further tasks and therefore already present. Finally, a machine-readable memory medium is provided, on which a computer program as described above is stored. Suitable memory media or data carriers for providing the computer program are, in particular, magnetic, optical and electrical memories such as, for example, hard disks, flash memories, EEPROMs, DVDs and the like. A download of a program via computer networks (Internet, Intranet, etc.) is also possible. Such a download in this case may take place in a hardwired or cable-bound or wireless manner (for example, via a WLAN network, a 3G, 4G, 5G or 6G connection, etc.).

Further advantages and embodiments of the present invention result from the description herein and from the figures.

The present invention is schematically represented in the figures based on exemplary embodiments and is described below with reference to the figures.

DETAILED DESCRIPTION OF EXAMPLE EMBODIMENTS

Figure 1:
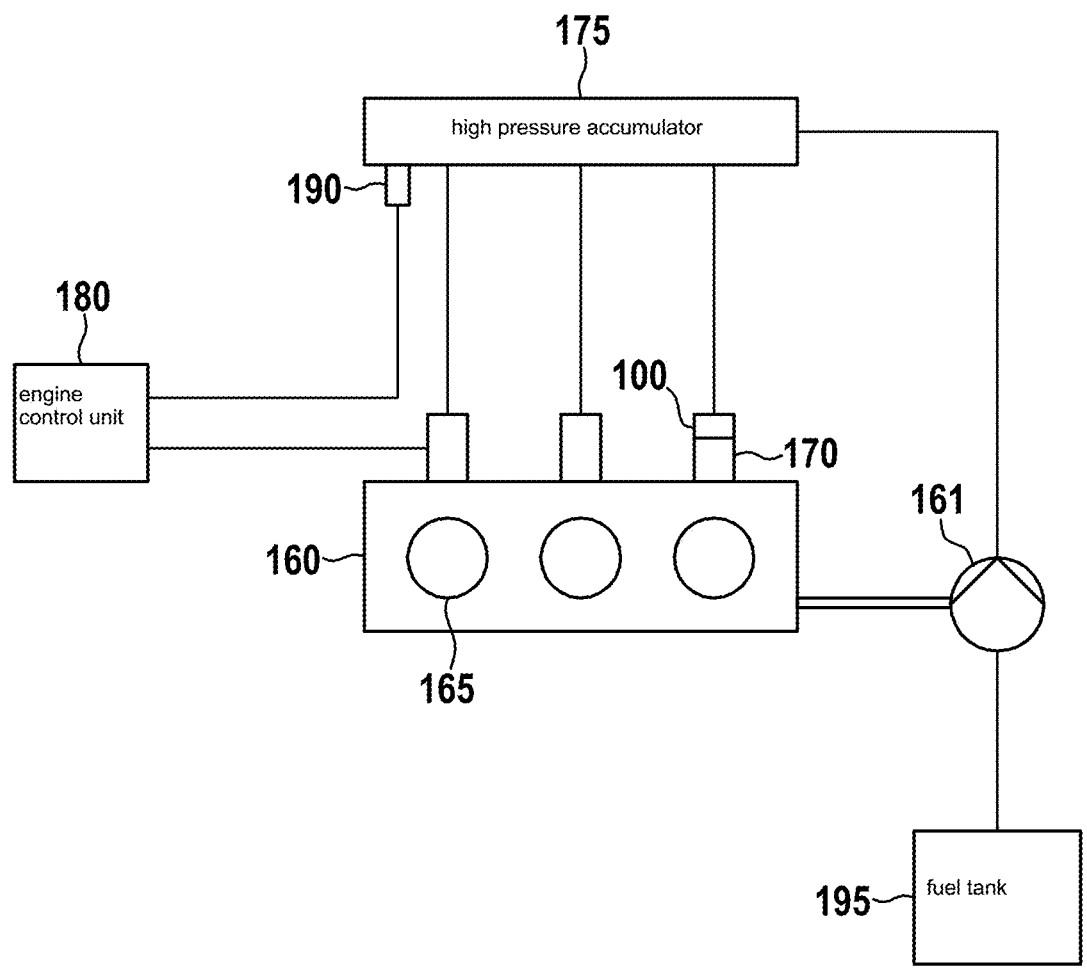
FIG. 1 schematically shows an internal combustion engine including a common-rail system, which is suitable for carrying out a method according to the present invention.

An internal combustion engine 160, which is suitable for carrying out a method according to the present invention, is schematically shown in FIG. 1. Internal combustion engine 160 includes, for example, three combustion chambers and associated cylinders 165. Each combustion chamber 165 is assigned a fuel injector 170 including a switch valve 100, which in turn is connected in each case to a high pressure accumulator 175, to a so-called rail, and via which it is supplied with fuel. It is understood that a method according to the present invention may also be carried out in an internal combustion engine that includes an arbitrary number of cylinders, for example, one, two, four, five, six, eight, ten, or twelve cylinders, etc.

High pressure accumulator 175 is fed fuel from a fuel tank 195 via a high pressure pump 161. High pressure pump 161 is coupled to internal combustion engine 160, specifically, for example, in such a way that the high pressure pump is driven via the internal combustion engine.

An activation of fuel injectors 170 for metering or injecting fuel into respective combustion chambers 165 takes place via a processing unit designed as an engine control unit 180. For the sake of clarity, only the connection from engine control unit 180 to one fuel injector 170 is represented; however, it is understood that each fuel injector 170 is connected accordingly to the engine control unit. Each fuel injector 170 in this case may be specifically activated. Furthermore, engine control unit 180 is configured, for example, to detect the fuel pressure in high pressure accumulator 175 with the aid of a pressure sensor 190.

Figure 2:
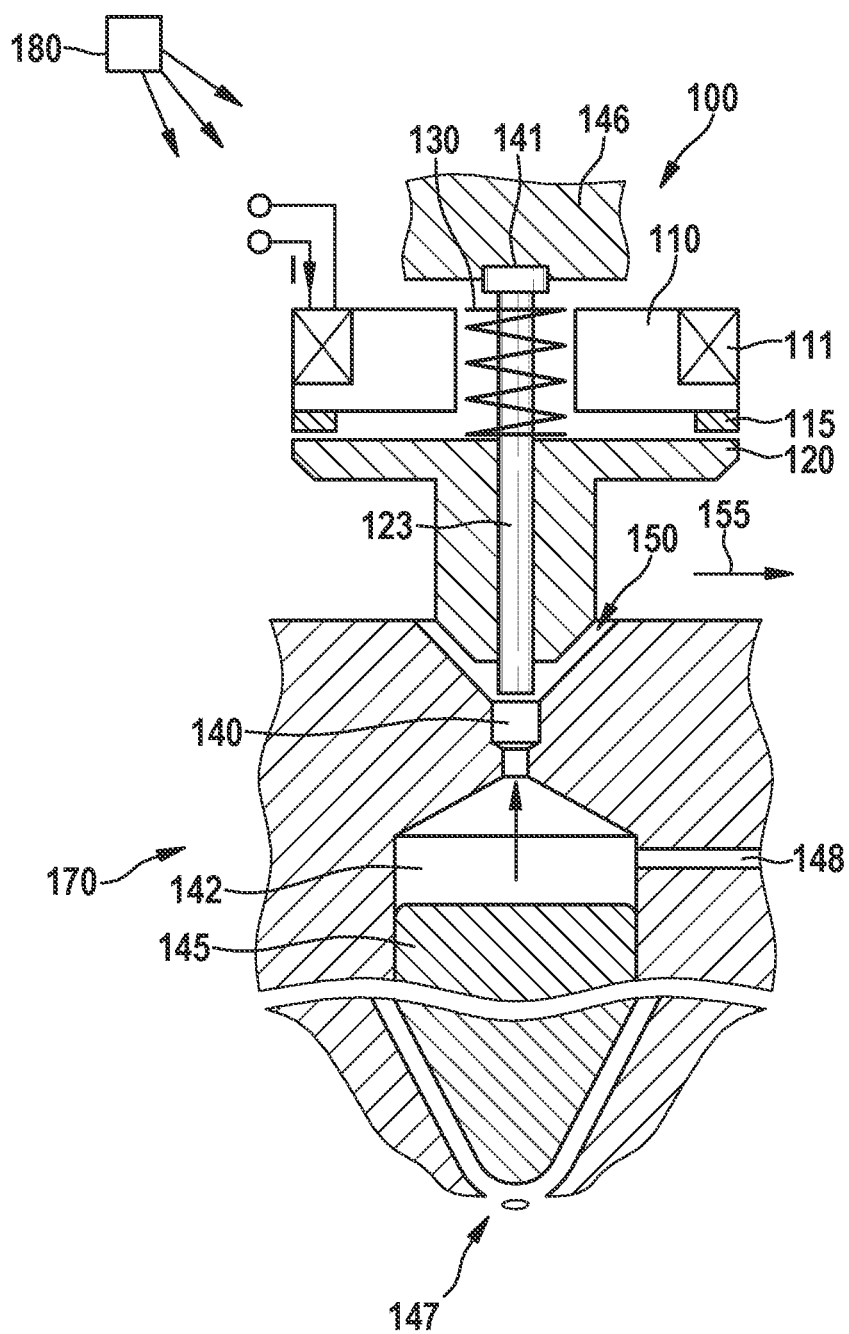
FIG. 2 schematically shows a switch valve of a fuel injector, in which a method according to the present invention is implementable.

A (pressure-compensated) switch valve or servo valve of a fuel injector 170 designed, for example, as a solenoid valve, is schematically shown in FIG. 2, which is only partially illustrated here and in which a method according to the present invention is implementable. Switch valve 100 includes an electromagnet 110 including a solenoid coil 111 as an actuator, which may be designed, for example, in the shape of a ring. When voltage is applied, for example, by an executing processing unit 180, a current I flows in solenoid coil 111.

A magnetic armature 120 is also provided, with which a flow-through and outlet opening 150 of switch valve 100 may be closed and/or unblocked. A spring 130 is further provided, which engages magnetic armature 120 and, absent energization of solenoid 111 and thus magnetic force, forces armature 120 into or against, and closes, through-opening 150. Spring 130 may be in abutment at its side facing away from the magnetic armature with a suitable component (not shown here) of switch valve 100.

When energizing solenoid coil 111, a magnetic force is built up and magnetic armature 120 is raised against the spring force of spring 130 and drawn in the direction of solenoid coil 111 or electromagnet 110. Through-opening 150 is unblocked in the process. When the solenoid coil is energized accordingly, magnetic armature 120 is able to be raised until it abuts an adjusting ring 115 situated at electromagnet 110.

Fuel, which is located in a valve chamber 140 and in a control space 142 of the fuel injector connected thereto and which initially presses on a nozzle needle 145 due to a high pressure and presses the nozzle needle into a seat and thus prevents an injection of fuel, may drain into return flow 155 when through-opening 150 is unblocked and, for example, may be fed to a fuel tank. Through-flow opening 150 thus serves as an outflow opening. With corresponding pressure conditions and an appropriate amount of fuel, which is guided into the return flow, nozzle needle 145 is able to be raised in order to unblock an opening 147 of the fuel injector for fuel, particularly since less fuel is subsequently fed through an inflow opening 148 than through outflow opening 150. Thus, through-flow or outflow opening 150 forms at the same time an outflow choke.

With the aid of a sensor 141, a so-called NC sensor, for example, in the form of a piezo element, pressure changes in valve chamber 140 are able to be detected. For this purpose, sensor 141 is situated at the end of a bolt 123, which passes through magnetic armature 120. Sensor 141 is impacted by pressure changes via bolt 123. In this case, sensor 141 is seated in a holding plate 146 of the outflow or in a housing part.

Figure 3:
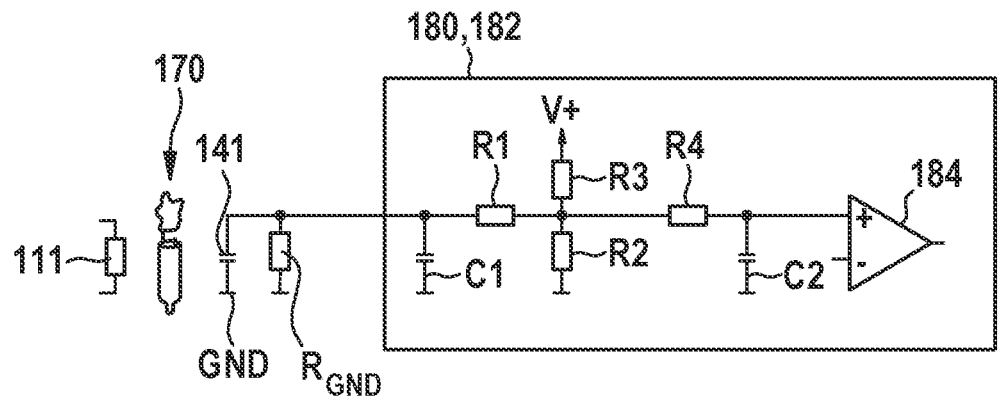
FIG. 3 shows a circuit configuration for explaining a method according to the present invention in one preferred specific example embodiment.

A circuit configuration is represented in FIG. 3 for explaining a method according to the present invention in one preferred specific embodiment. For this purpose, solenoid 111 as well as sensor 141 (represented here as capacitance), in particular, are shown for fuel injector 170, as well as a read-out unit or measuring circuit 182, which may be part of processing unit 180. Shown here, in particular are capacitances C1 and C2 as well as resistances R1, R2, R3, and R4 and an AD converter 184 and a supply voltage V+. A shunt (short-circuit) of sensor 141 to ground GND is further represented with the aid of a resistance $R_{GND}$.

The values of the components in the measuring circuit may, for example, be the following: C1=13.2 nF, C2=22 pF, R1=100 kohms, R2=215 kohms, R3=82.5 kohms, R4=1 kohm, V+=5 V. It is understood that these values are only exemplary for a possible measuring circuit, based on these values, however, effects on the sensor signal are explained below for different possible values for $R_{GND}$.

Figure 4:
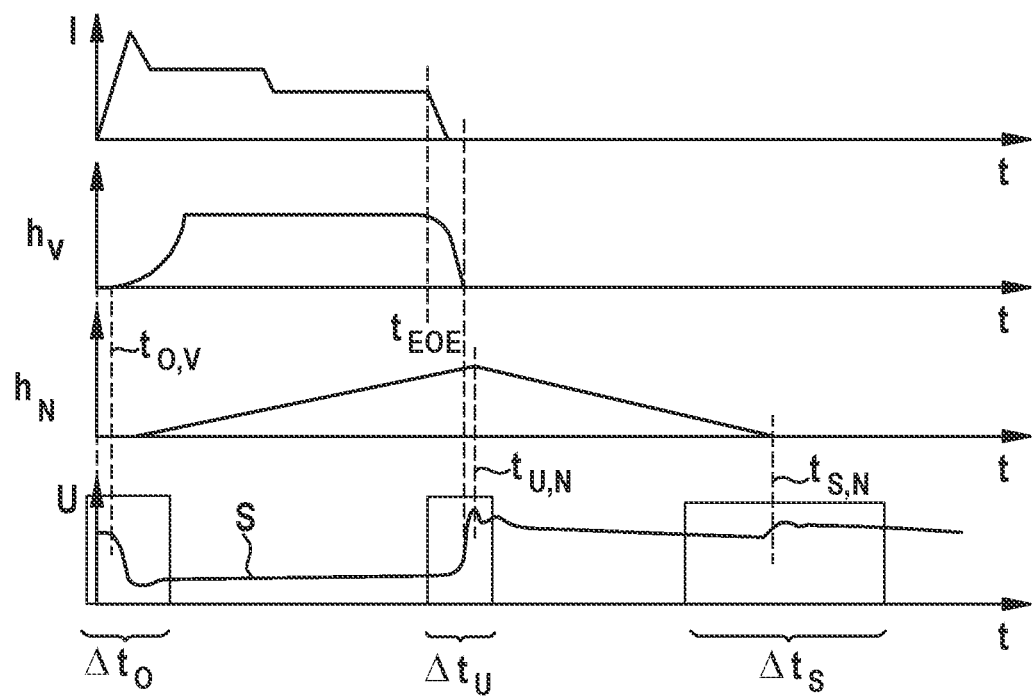
FIGS. 4 through 11 show signal curves for explaining a method according to the present invention in one preferred specific example embodiment.
Figure 5:
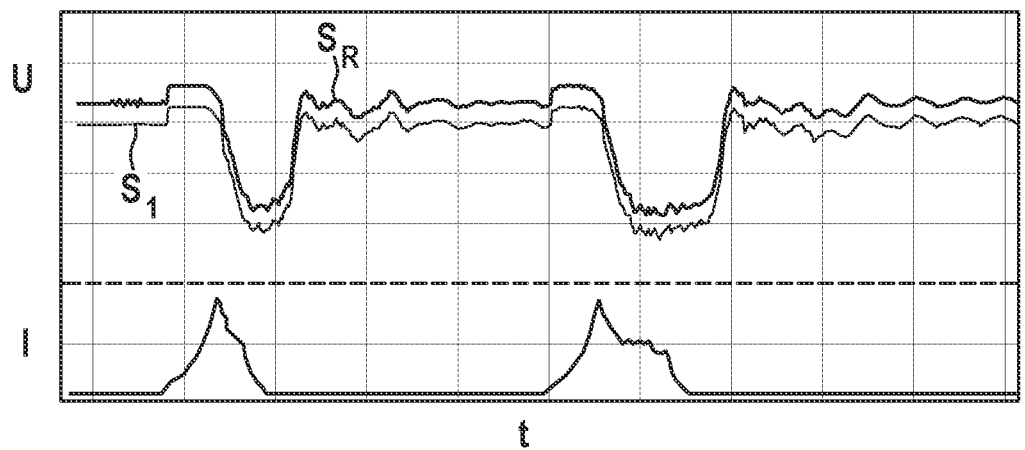
Figure 6:
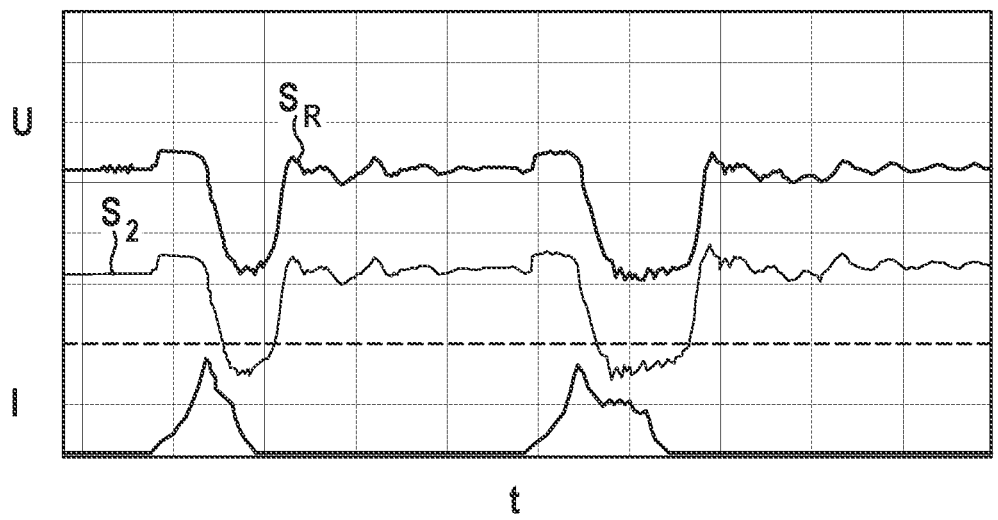

In FIG. 4, curves for current I, which is applied to the solenoid coil during the activation, of valve lift $h_V$ (i.e. of the lift of the magnetic armature of the switch valve), of the needle lift $h_N$ (i.e., of the lift of the nozzle needle of the fuel injector) and sensor signal S of the NSC as voltage U, are plotted in each case over time t.

In this case, valve opening point in time $t_{O,V}$, needle reverse point in time $t_{U,N}$ and needle closing point in time $t_{S,N}$, in particular, are entered. Associated time windows or measuring windows are also shown, in which these points in time lie, namely a measuring window $\Delta t_O$ 'valve opening,' a measuring window $\Delta t_U$ 'needle reverse' and a measuring window $\Delta t_S$ 'needle closing.' A point in time $t_{EOE}$ of the end of the activation is also shown (EOE stands for "End of Energizing").

Sensor signals or their curves are shown in FIGS. 5 through 8 for different values of resistance $R_{GND}$ according to FIG. 3 as real measured values. These signal curves changed by resistance $R_{GND}$ are identified by $S_1$ ($R_{GND}$=1 mohm), $S_2$ ($R_{GND}$=100 kohms), $S_3$ ($R_{GND}$=10 kohms) and $S_4$ ($R_{GND}$=1 kohm), whereas a reference curve is shown by $S_R$, which applies to an infinite resistance RGND=∞, i.e., with no shunt. The reference curve corresponds in this case, in principle, to curve S from FIG. 4. Current I as in FIG. 4 is also shown.

As mentioned above, the aforementioned effects of a shunt are easy to recognize here. A shunt to ground where $R_{GND}$=1 mohm or 100 kohms results essentially in a shift of the NCS signal level downward. The shape of the NCS signal, however, does not significantly change.

Figure 7:
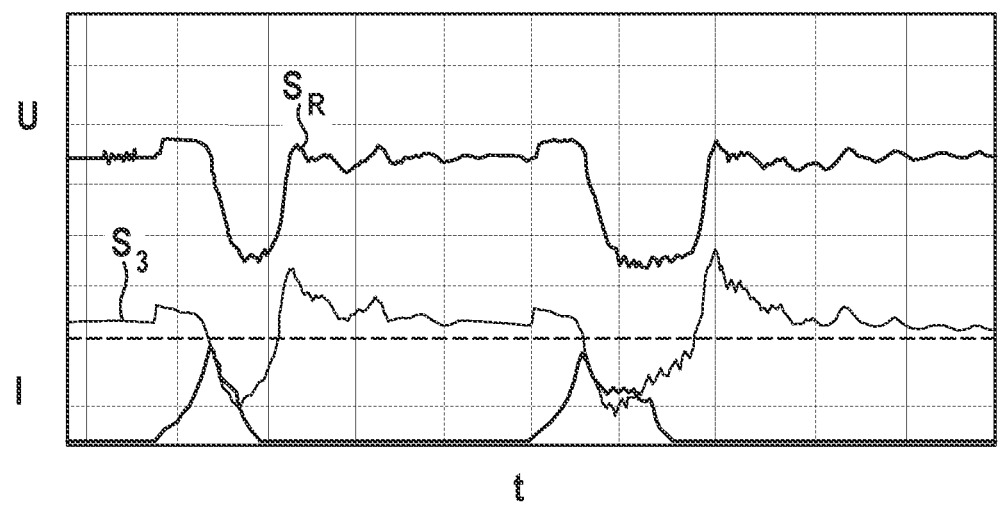
Figure 8:
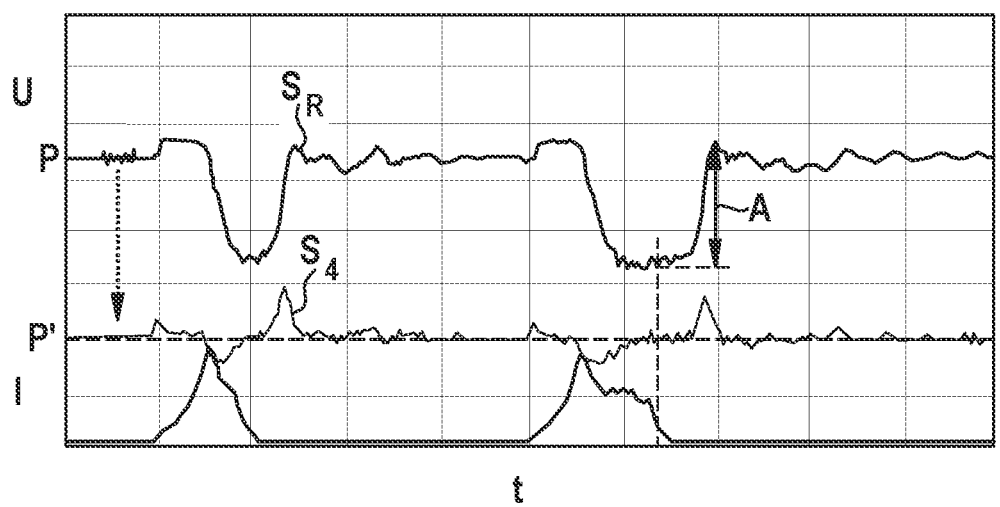

In contrast, a shunt to ground where $R_{GND}$=10 kohms results in a clearly recognizable change of the signal shape. The algorithms in the control unit for determining the valve opening point in time, the needle reverse point in time and the needle closing point in time may potentially provide clearly erroneous measured values. Conventional diagnostic methods, however, generally report no error, because the signal amplitude, as is seen, for example, in FIG. 7, is even slightly higher than in the error-free state. How signal amplitude A may be defined is shown, for example, in FIG. 8.

Even in the case of a shunt to ground where $R_{GND}$=1 kohm (FIG. 8), this diagnosis is not yet responsive, although the sensor signal or NCS signal no longer has much in common with its original shape. Signal level P for the reference curve as well as changed signal level P' for the curve with the shunt to ground is also entered here.

Such drastic changes of the signal shape usually mean that valid measured values for the valve opening point in time, the needle reverse point in time or the needle closing point in time are no longer found, because the plausibility criteria contained in the algorithms for the signal evaluation are not met.

A sequence of a method according to the present invention in one preferred specific embodiment, in particular, with respect to the aspect of the shunt, is explained by way of example in greater detail below.

The signal level of the sensor signal is initially determined or measured. The sensor signal includes three characteristic features: valve opening point in time, needle reverse point in time and needle closing point in time, as shown in FIG. 4. To determine the three points in time, the sensor signal may be scanned and digitized, for example, in the control unit in each case in a defined time interval. The time intervals referred to as measuring window or time window are represented in FIG. 4. A signal level may, in principle, be ascertained in each of the three measuring windows. The signal level is preferably determined, however, in the measuring window 'valve opening' during the temporally first activation of an injection sequence, because there the curve of the sensor signal is generally largely constant.

Figure 9:
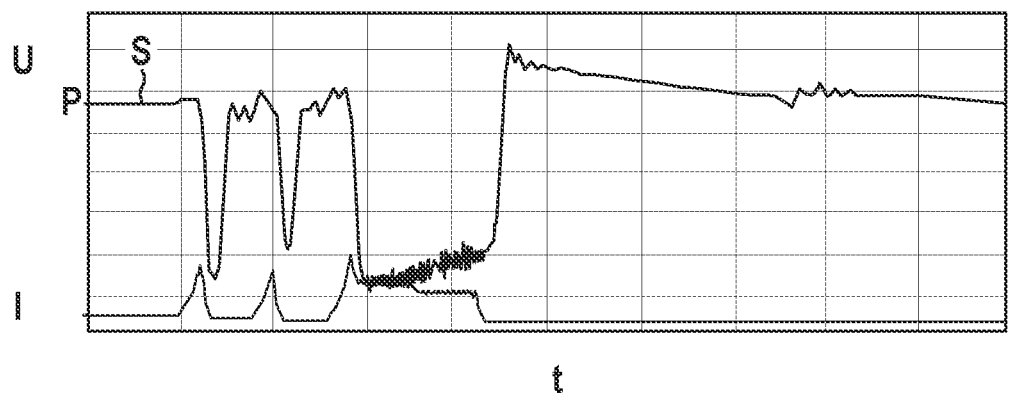

This may be seen in FIG. 9, in which multiple injections are shown in succession; in the first injection, however, signal level P is constant prior to the start of the activation, in particular, up to the point in time identified with the aid of an arrow. Hydraulic pressure oscillations, which have been triggered by preceding injections, have generally completely or largely faded there.

Figure 10:
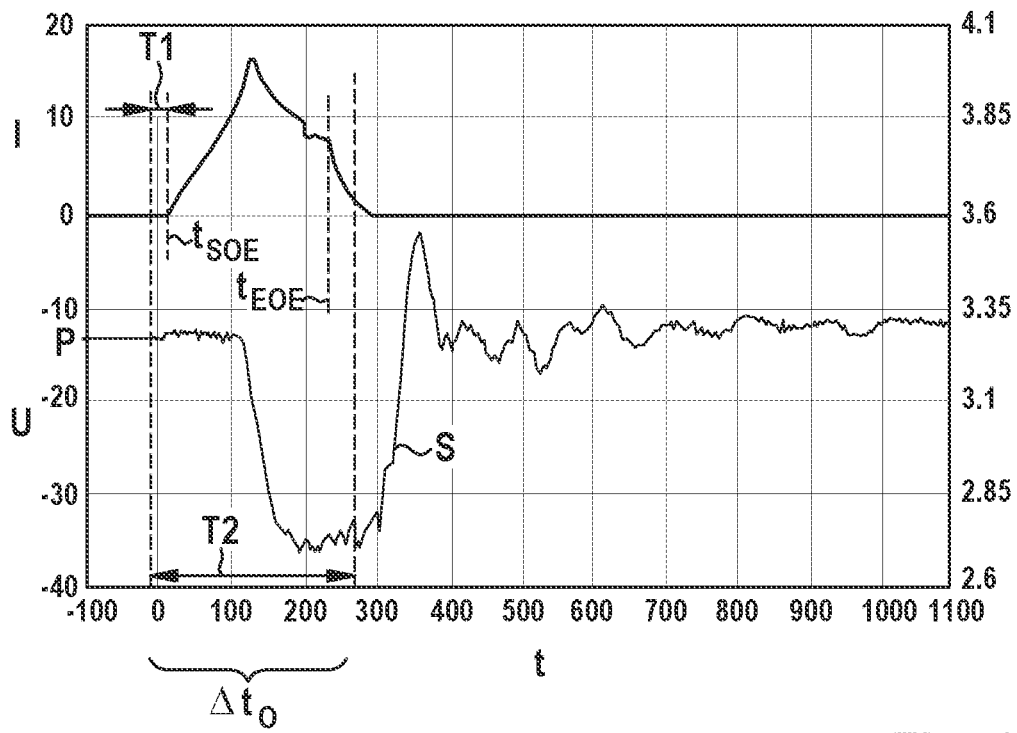

As shown in FIG. 10, measuring window $\Delta t_O$ 'valve opening' starts preferably at a temporally fixed interval T1 prior to the start of the electrical activation at point in time $t_{SOE}$ (SOE stands for "Start of Energizing").

The width or duration T2 of the measuring window may have a constant variable for all operating points of the internal combustion engine, if T2 is selected to be sufficiently large. Alternatively, interval T1 and/or width T2 may also be variably implemented as a function of the operating point.

Figure 11:
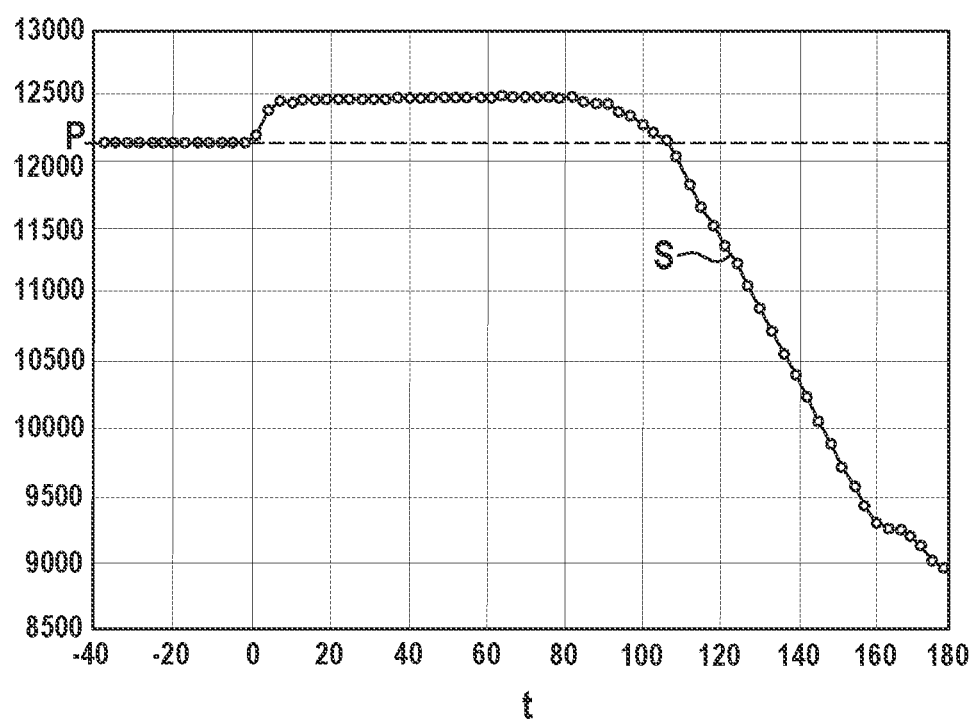

As shown in FIG. 11, signal level P in measuring window 'valve opening' is calculated preferably as a mean value of the sensor signal in a defined time interval prior to the activation start of the temporally first activation of an injection sequence. In the example, the mean value of the last six scan values (shown as points or measuring points in FIG. 11) of the sensor signal is used as signal level P prior to the activation start.

This is followed by a recognition and classification of the electrical errors. In the conventional diagnosis, it is initially checked whether the signal amplitude in measuring window $\Delta t_u$ 'needle reverse point' is implausibly too low. If so, the mean value of the sensor signal in the measuring window 'needle reverse point' is calculated. Based on the mean value, the error is assigned to one of the three possible error types. If the sensor signal is interrupted (cable break or sensor failure), then a quiescent level of the sensor signal is measured in the control unit, which is approximately 3 V. In the case of a short-circuit to ground, the level of the sensor signal is significantly lower than 3 V. In the case of a short-circuit to battery, the level of the sensor signal is significantly higher than 3 V.

Two recognition thresholds are preferably used to classify the errors. If the mean value, for example, is lower than 1.3 V (lower recognition threshold), then a short-circuit to ground is reported. If the mean value, for example, is higher than 7 V (upper recognition threshold), then a short-circuit to battery is reported. The upper recognition threshold should preferably be defined as a function of the battery voltage. With increasing battery voltage, the upper recognition threshold should be higher. The same recognition thresholds may be used in order to check the measured value of the signal level P in the measuring window 'valve opening.'

Figure 12:
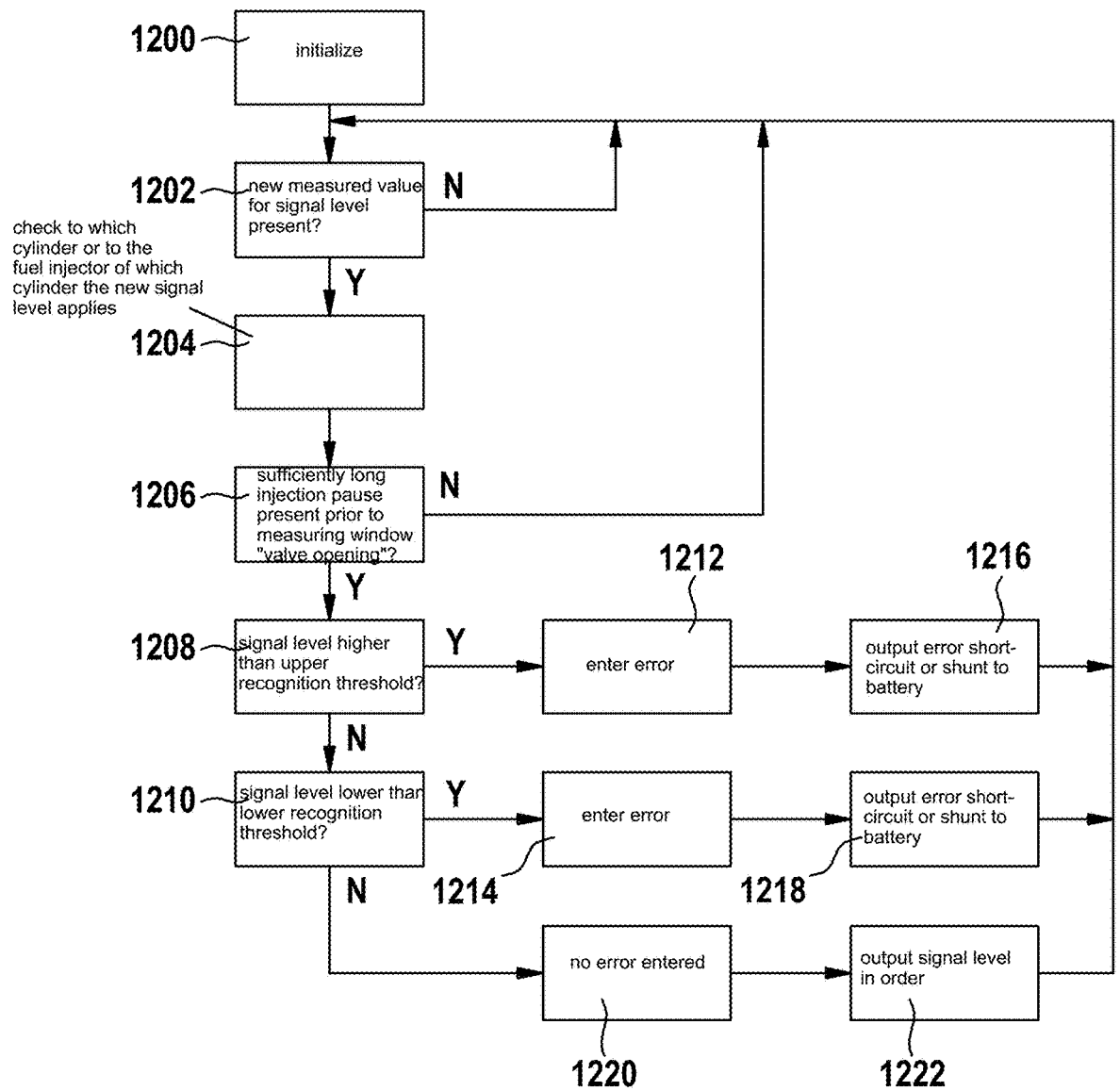
FIG. 12 shows a sequence of a method according to the present invention in one preferred specific example embodiment.

The algorithm for recognizing and classifying electrical short-circuits or shunts based on the signal level in the measuring window 'valve opening' is represented in FIG. 12 with reference to a flowchart. First, an initialization (step 1200) takes place, in which, for example, the value for the signal level is set to zero. In step 1202, it is checked whether a new measured value for the signal level is present. If yes (Y), it is checked in step 1204 to which cylinder or to the fuel injector of which cylinder this applies.

Based on the four examples in FIGS. 5 through 9, it is readily apparent that an electrical shunt changes the signal level P significantly more drastically than the signal amplitude. To increase the robustness of the diagnostic method, it is checked in the method in FIG. 12 in step 1206, for example, whether a sufficiently long injection pause (for example, 2 ms) was present prior to the measuring window 'valve opening.' This ensures that the signal level is sufficiently stable and reliable and is not potentially distorted by hydraulic pressure oscillations of a closely preceding injection. If this is so (Y), the two aforementioned recognition thresholds are checked. If the signal level is higher than the upper recognition threshold (check in step 1208), an error is entered in step 1212 for the affected cylinder, the error short-circuit or shunt to battery is output in step 1216.

If the signal level is lower than the lower recognition threshold (check in step 1210), an error is entered in step 1214 for the affected cylinder, the error short-circuit or shunt to ground is output in step 1218.

If none of the cases apply, no error is entered for any cylinder (step 1220). In step 1222, it may be output that the signal level is in order and the two aforementioned errors are therefore not present.

Both observations "signal amplitude in the measuring window 'needle reverse point'" and "signal level in the measuring window 'valve opening'" proceed, in particular, in parallel and separately from one another. The pieces of error information of both methods are collected preferably in terms of a logical OR-link.

In addition, an error debouncing may take place. The error debouncing as compared to a conventionally existing diagnostic concept does not change, however. Merely the meaning of the error paths is expanded (shunt in addition to short-circuit).

Figure 13:
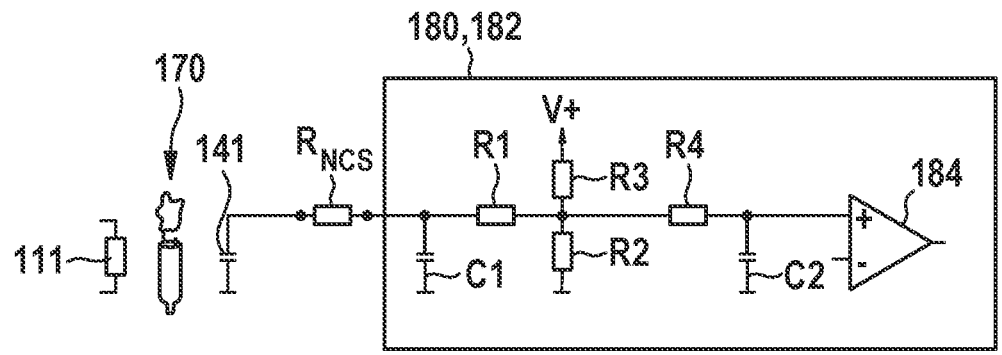
FIG. 13 shows a circuit configuration for explaining a method according to the present invention in one further preferred specific example embodiment.

A circuit configuration is represented in FIG. 13 for explaining a method according to the present invention in one further preferred specific embodiment. The circuit configuration corresponds to the circuit configuration from FIG. 3; here, however, an increased contact resistance $R_{NCS}$ between sensor 141 and measuring circuit 182 is shown instead of the resistance to ground.

The values of the components in the measuring circuit may also, for example, be the following: C1=13.2 nF, C2=22 pF, R1=100 kohms, R2=215 kohms, R3=82.5 kohms, R4=1 kohm, V+=5 V. It is understood that here, too, these values are only exemplary for one possible measuring circuit; however, based on these values, effects on the sensor signal are explained below for different possible values for $R_{NCS}$.

In FIGS. 14 through 17, sensor signals and their curves are shown for different values of resistance $R_{NCS}$ according to FIG. 13 as real measured values. These signal curves changed by resistance $R_{NCS}$ are identified by $S_5$ ($R_{NCS}$=50 kohms), $S_6$ ($R_{NCS}$=100 kohms), $S_7$ ($R_{NCS}$=200 kohms) and $S_8$ ($R_{NCS}$=500 kohms), whereas a reference curve is shown by $S'_R$, which applies to a resistance ($R_{NCS}$=0) not present. The reference curve in this case corresponds, in principle, to curve S from FIG. 4. In addition, current I as in FIG. 4 is also shown.

Figure 14:
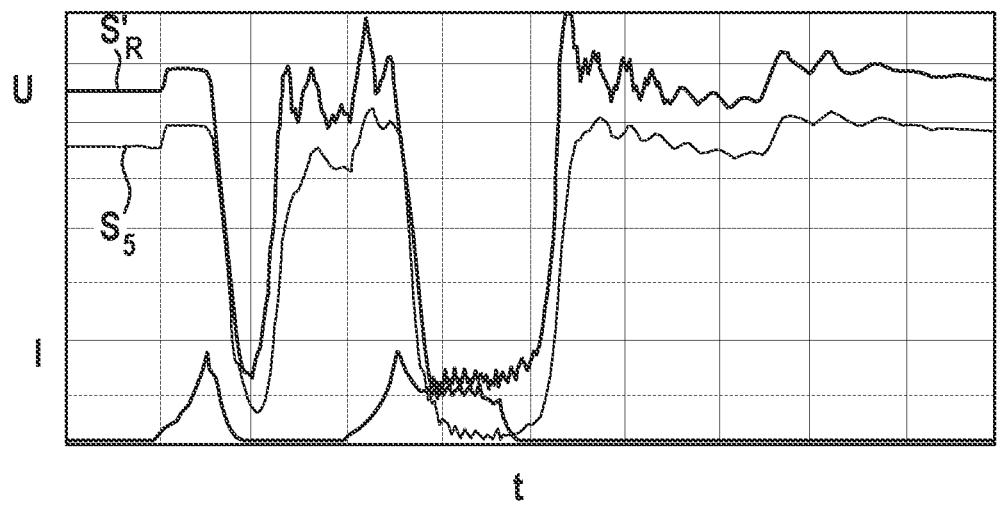
FIGS. 14 through 19 show signal curves for explaining a method according to the present invention in one further preferred specific example embodiment.
Figure 15:
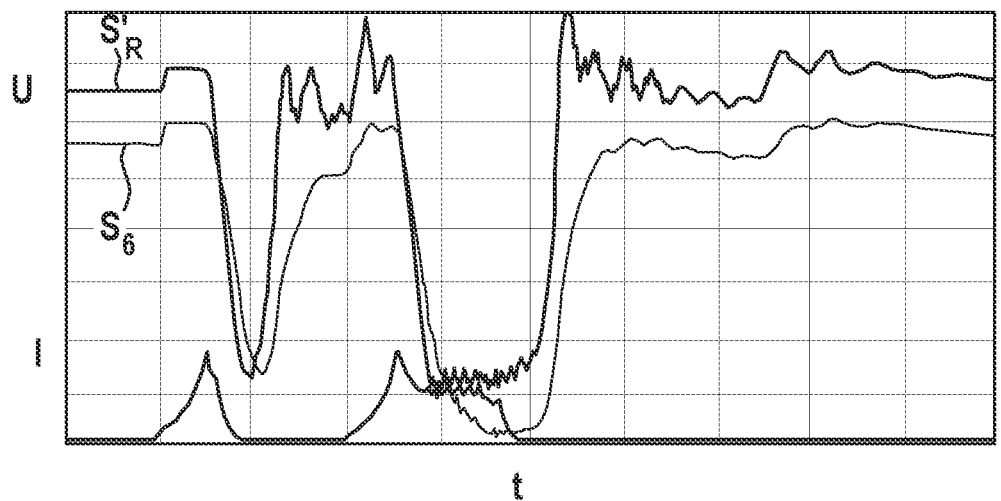
Figure 16:
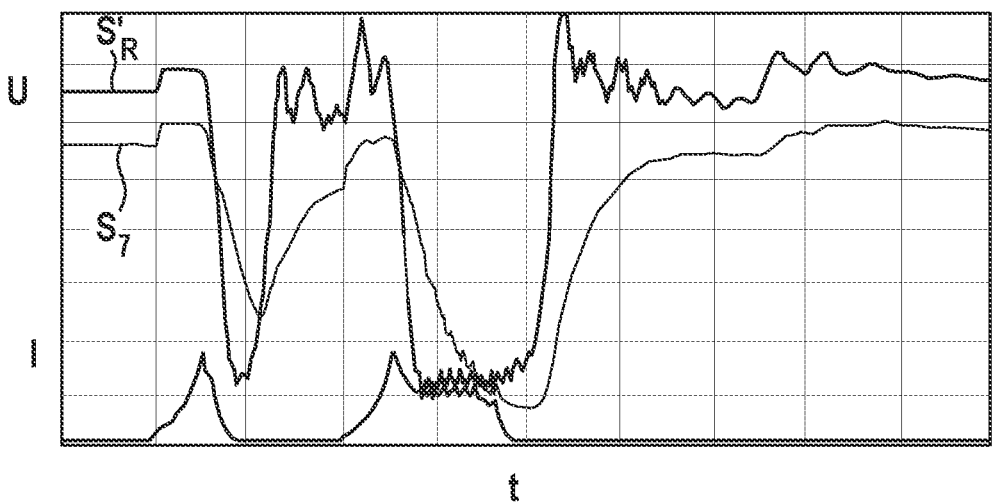
Figure 17:
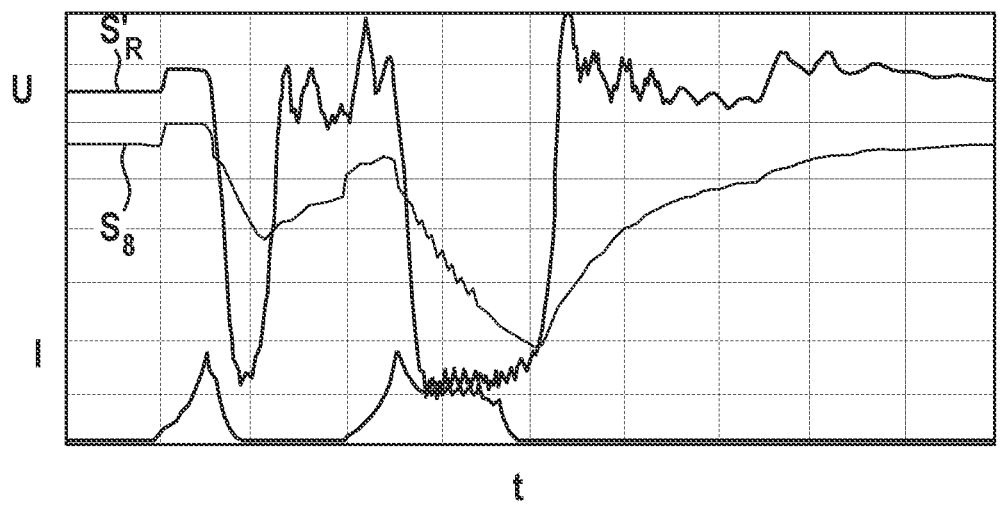

As mentioned, the sensor signal is significantly smoother already at a contact resistance of 50 kohms than the signal in the error-free state (FIG. 14). The algorithms in the control unit for determining the points in time valve opening, needle reverse point and needle closing at this contact resistance deliver already significant erroneous measured values. With increasing contact resistance, the cut-off frequency of the low-pass filtering drops (FIGS. 15 and 16), so that the shape of the sensor signal at 500 kohms (FIG. 17) no longer has much in common with original shape $S'_R$.

Such drastic changes in the signal shape usually mean valid measured values for the valve opening point in time, the needle reverse point in time or the needle closing point in time are no longer found in the control unit, because the plausibility criteria contained in the algorithms for signal evaluation are not met.

A sequence of a method according to the present invention in one further preferred specific embodiment, in particular, with respect to the aspect of the increased contact resistance, is explained by way of example below.

The rise time is initially determined. The sensor signal includes three characteristic features: valve opening point in time, needle reverse point in time and needle closing point in time, as shown in FIG. 4. To determine the three points in time, the sensor signal, for example, in the control unit, may be scanned and digitized in each case in a defined time interval. The time intervals identified as measuring window or time window are represented in FIG. 4. In principle, a rise time may be ascertained in each of the three measuring windows. Due to the level of the signal rise, the rise time is ascertained preferably in the measuring window 'needle reverse point.'

Figure 18:
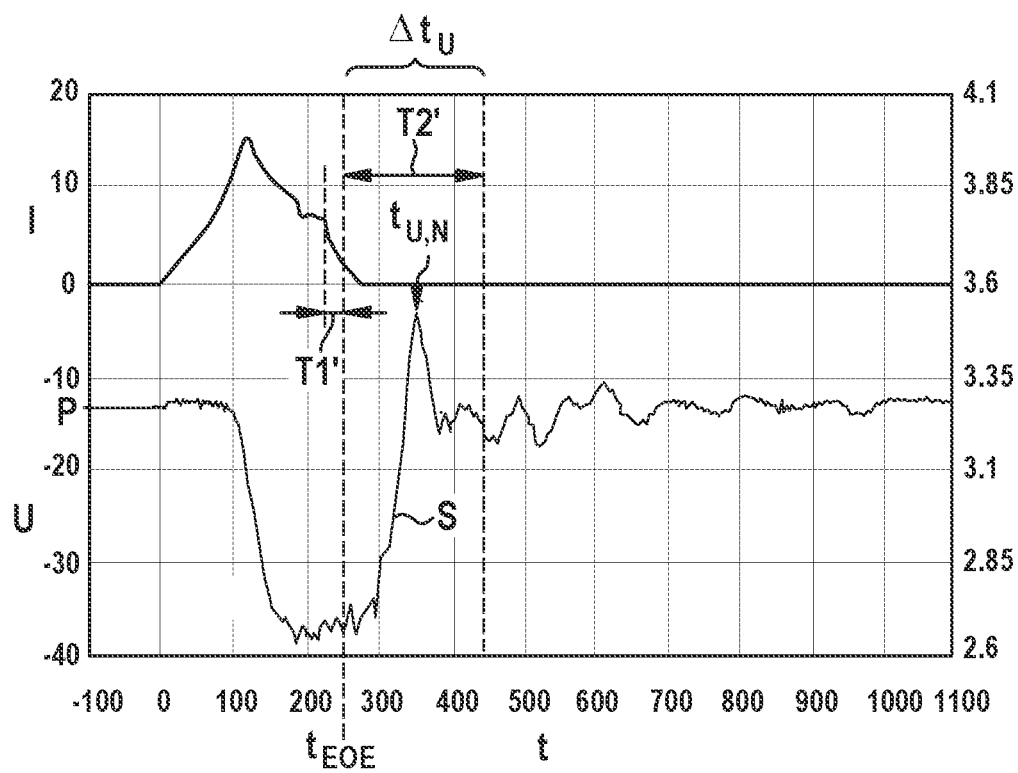

As shown in FIG. 18, measuring window $\Delta t_U$ 'needle reverse point' starts preferably at a temporally fixed interval T1' after the end of the electrical activation ($t_{EOE}$, cf. in this regard also FIG. 4). The duration or width T2' of the measuring window may have a constant variable for all operating points of the internal combustion engine, if T2' is selected to be sufficiently large. Alternatively, interval T1' and/or width T2' may also be variably implemented as a function of the operating point.

Figure 19:
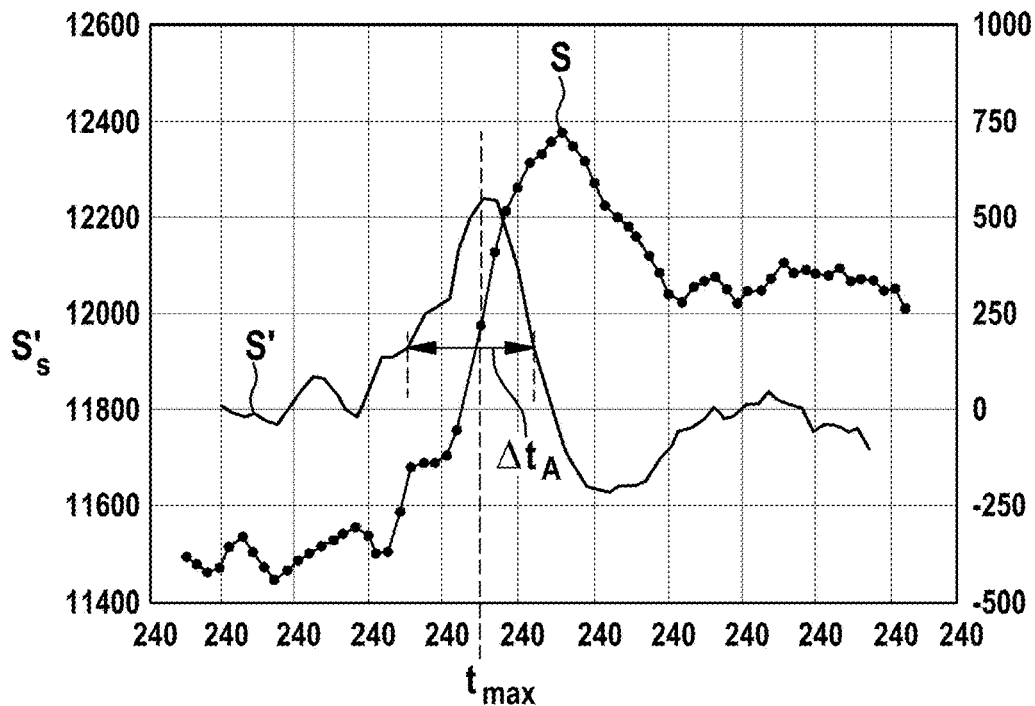

The rise time of the sensor signal in the measuring window 'needle reverse point' is preferably ascertained based on gradient curve S' as represented in FIG. 19. In the example, the sensor signal is shown as points (measuring points). The gradient in this case is determined for each measuring point, for example, as the difference between the measuring point and the preceding or following measuring point.

For this purpose, a threshold $S'_s$ is calculated via a threshold value factor based on the maximum gradient or on the maximum value of gradient curve S' in the measuring window 'needle reverse point,' identified here by $t_{max}$, and subsequently the points in time are ascertained when this threshold value is passed through prior to and after point in time $t_{max}$. Rise time $\Delta t_A$ may then be calculated as the difference between the two points in time of the threshold value passage. Alternatively, the amplitude may be used to ascertain a rise time at the sensor signal.

This is followed by a recognition of the electrical error. In the conventional diagnosis, it is initially checked whether the signal amplitude in measuring window $\Delta t_U$ 'needle reverse point' is implausibly low. If yes, the mean value of the sensor signal in the measuring window 'needle reverse point' is calculated. Based on the mean value, the error is assigned to one of the three possible error types. If the sensor signal is interrupted (cable break or sensor failure), then a quiescent level of the sensor signal is measured in the control unit, which is approximately 3 V. In the case of a short-circuit to ground, the level of the sensor signal is significantly lower than 3 V. In the case of a short-circuit to battery, the level of the sensor signal is significantly higher than 3 V.

Two recognition thresholds are preferably used for classifying the errors. If the mean value is, for example, lower than 1.3 V (lower recognition threshold), then a short-circuit to ground is reported. If the mean value is, for example, higher than 7 V (upper recognition threshold), then a short-circuit to battery is reported. The upper recognition threshold should preferably be defined as a function of the battery voltage. With increasing battery voltage, the upper recognition threshold should become higher.

Figure 20:
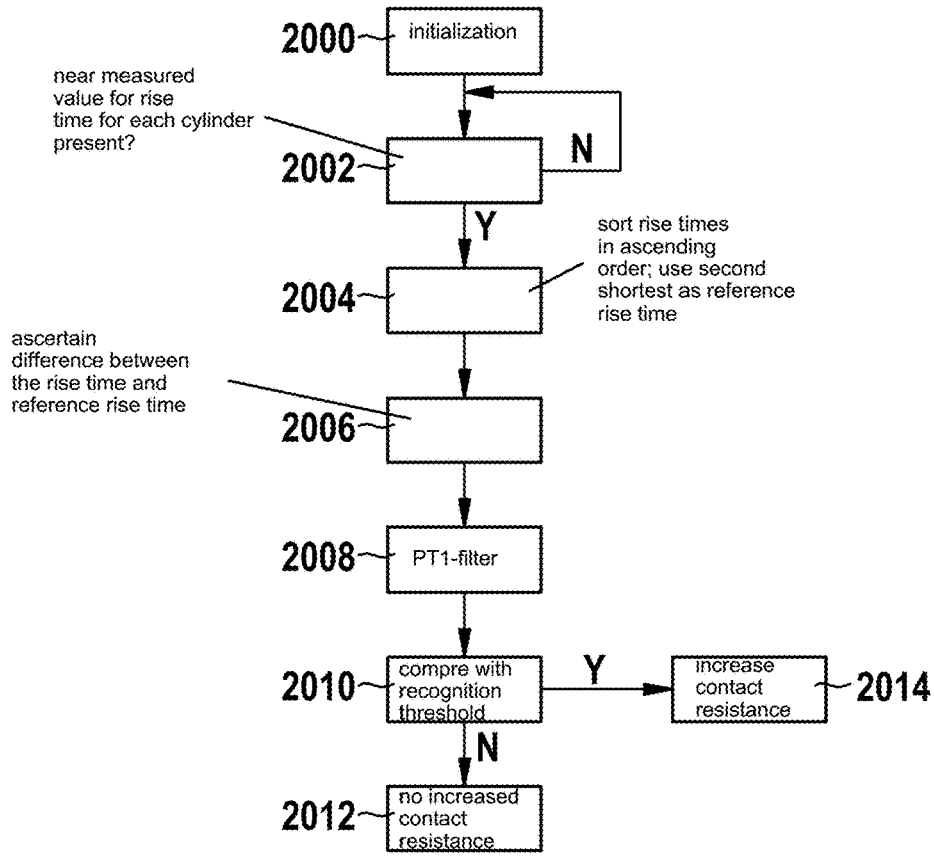
FIG. 20 shows a sequence of a method according to the present invention in one further preferred specific example embodiment.

If none of these errors are present, the check takes place on an increased contact resistance based on the rise time. One algorithm for recognizing this error is represented in FIG. 20 with reference to a flowchart. First, an initialization takes place (step 2000), in which, for example, the value for the rise time is set to zero. In step 2002, it is checked whether a new measured value for the rise time is present for each cylinder, in particular, in each case at the preceding injection sequence. If yes (Y), these values of the rise times are sorted in ascending order in step 2004.

The rise time of the sensor signal in the measuring window 'needle reverse point' is a function of, among other things, the activation duration, the rail pressure, the injector temperature and the fuel, and is subject to high dynamics during the driving operation. Since dynamic changes of the operating point occur in similar measure at all cylinders, an increased contact resistance at an injector may be detected by the comparison with the other cylinder. The affected cylinder has an increased rise time in comparison to the other cylinders. The cylinder having the second shortest rise time is ascertained; this rise time is used as a reference rise time.

In a step 2006, the difference between the rise time and the reference rise time is then ascertained for each cylinder. To further increase the robustness, the difference for each cylinder is PT1-filtered in step 2008. The output of the PT1 filter is compared in step 2010 with a recognition threshold (for example, an admissible, maximum deviation of the rise time of an error-free system); if this recognition threshold is exceeded (Y), then an increased contact resistance is reported in step 2014. If not, according to step 2012, no increased contact resistance is present.

In order to compare rise times with one another at similar activation durations in each injection cycle, the difference from the second shortest rise time is calculated preferably in an injection type-specific manner, or only in one injection type, for example, in a main injection.

In addition, an error debouncing may take place. The error debouncing as compared to a conventionally existing diagnostic concept does not change, however. Merely the meaning of the error paths is expanded (increased contact resistance in addition to electrical interruption).

What is claimed is:

1. A method for recognizing an error in a sensor signal during operation of a fuel injector of an internal combustion engine, in which a switch valve of the fuel injector is activated using an activation signal, and in which the sensor signal is detected as a signal of a sensor, which is provided for detecting characteristic operating points of the fuel injector, the method comprising:

in a predefined time window of the sensor signal, which includes a point in time of a characteristic operating point of the fuel injector, determining at least one property of the sensor signal, which includes a signal level and/or a rise time; and determining, based on the at least one property of the sensor signal, whether an error is present, wherein the error, which is determined based on the signal level as the at least one property of the sensor signal, includes the presence of a short-circuit of the sensor, and/or the error, which is determined based on the rise time as the at least one property of the sensor signal, includes a contact resistance between the sensor and a read-out unit, which is higher than a setpoint value.

2. The method as recited in claim 1, wherein the predefined time window of the sensor signal, in which the at least one property of the sensor signal is determined, includes a point in time of an opening of the switch valve and/or a point in time of a reversal of a nozzle needle of the fuel injector, as the characteristic operating point.

3. The method as recited in claim 1, wherein a start of the predefined time window is determined as a function of a start and/or of an end, of the activation of the switch valve.

4. The method as recited in claim 1, wherein the signal level as the at least one property of the sensor signal is compared with one or with multiple level threshold values, and whether an error is present is determined as a function of the comparison.

5. The method as recited in claim 1, wherein the rise time as the at least one property of the sensor signal is compared with a reference rise time, and whether an error is present is determined as a function of the comparison.

6. The method as recited in claim 5, wherein when the rise time as the at least one property of the sensor signal is higher than the reference rise time by more than a predefined time threshold value, determining that an error is present.

7. The method as recited in claim 5, wherein a rise time of another fuel injector of the internal combustion engine or an average rise time of multiple other fuel injectors of the internal combustion engine is used as a reference rise time.

8. The method as recited in claim 1, whether another error is present is determined, based on an amplitude of the sensor signal in the predefined time window or in one other predefined time window of a characteristic operating point of the fuel injector.

9. The method as recited in claim 8, wherein the signal level is also determined.

10. The method as recited in claim 8, wherein the rise time as the at least one property of the sensor signal in the predefined time window only then determines, or is used to determine whether an error is present, only when no other error has been recognized based on the amplitude of the sensor signal.

11. A processing unit configured to recognize an error in a sensor signal during operation of a fuel injector of an internal combustion engine, in which a switch valve of the fuel injector is activated using an activation signal, and in which the sensor signal is detected as a signal of a sensor, which is provided for detecting characteristic operating points of the fuel injector, the processing unit configured to:
in a predefined time window of the sensor signal, which includes a point in time of a characteristic operating point of the fuel injector, determine at least one property of the sensor signal, which includes a signal level and/or a rise time; and
determine, based on the at least one property of the sensor signal, whether an error is present, wherein the error, which is determined based on the signal level as the at least one property of the sensor signal, includes the presence of a short-circuit of the sensor, and/or the error, which is determined based on the rise time as the at least one property of the sensor signal, includes a contact resistance between the sensor and a read-out unit, which is higher than a setpoint value.

12. A non-transitory machine-readable memory medium on which is stored a computer program for recognizing an error in a sensor signal during operation of a fuel injector of an internal combustion engine, in which a switch valve of the fuel injector is activated using an activation signal, and in which the sensor signal is detected as a signal of a sensor, which is provided for detecting characteristic operating points of the fuel injector, the computer program, when executed by a processing unit, causing the processing unit to perform the following steps:
in a predefined time window of the sensor signal, which includes a point in time of a characteristic operating point of the fuel injector, determining at least one property of the sensor signal, which includes a signal level and/or a rise time; and
determining, based on the at least one property of the sensor signal, whether an error is present, wherein the error, which is determined based on the signal level as the at least one property of the sensor signal, includes the presence of a short-circuit of the sensor, and/or the error, which is determined based on the rise time as the at least one property of the sensor signal, includes a contact resistance between the sensor and a read-out unit, which is higher than a setpoint value.

* * * * *